3,106,453
PROCESS FOR PRODUCING DRY LIME HYDRATE
Bolton L. Corson, Chestnut Hill, Pa., assignor to G. & W. H. Corson, Incorporated, Plymouth Meeting, Pa., a corporation of Delaware
No Drawing. Continuation of application Ser. No. 850,079, Nov. 2, 1959. This application Apr. 22, 1963, Ser. No. 274,811
9 Claims. (Cl. 23—188)

The invention relates to a new and useful method of making commercial hydrated lime. More particularly, the invention is directed to an improved method of making lime hydrate from a "fast-acting quicklime." The term "fast-acting quicklime" as used in this specification and claims means a quicklime which undergoes rapid hydration when contacted with water, the hydration or slaking time being generally below about one minute, and in many instances of the order of 5 seconds or less. The present application is a continuation of application Serial No. 850,079, filed November 2, 1959, now abandoned.

One of the essential properties of hydrated lime for use as mortars, plasters, etc., is good plasticity. Plasticity, as it refers to hydrated lime may be defined as a property which renders the hydrated lime capable of spreading easily on an absorbent surface, i.e. plasticity depends directly upon the ability of the material in putty form to hold its water against the suction of an absorbent surface to which it is applied.

In order that hydrated lime may be classified as a plastic finishing lime, it must so react with water as to produce a putty having a plasticity of 200 or greater as determined by the Emley plasticimeter developed by the United States Bureau of Standards.

Certain requirements are essential to the proper hydration of quicklime in order for the hydrate to have the desired degree of plasticity. To begin with, a large excess of water must be present at the time of hydration. By this is meant not that a large excess of water over that theoretically needed must be present at the start of the hydration of the mass of quicklime, but that there must be water in the liquid phase available to practically every particle of quicklime at the time that the particle of quicklime changes from the oxide form to the hydroxide form. It is well known that calcium oxide hydrated essentially in the presence of steam is extremely nonplastic.

With fast-acting quicklimes, hydration appears to take place at the surface of the particles, and the heat of hydration is so great that the water is converted to steam before it can penetrate the particles. In fact, with some very fast-acting quicklimes, the hydration reaction may be explosive in nature. Thus, the greater portion of the quicklime is hydrated in an atmosphere of steam rather than being surrounded by water in the liquid phase. This is true even if considerably more water is used than is necessary to satisfy the chemical requirement of the quicklime.

Attempts have been made to overcome this condition by endeavoring to prevent the temperature of the water from rising above 212° F. In such cases the hydration of the quicklime is slowed down and this has quite a detrimental effect on plasticity.

More recently substantial improvements have been made in methods of hydrating quicklime to produce a lime hydrate of considerably improved properties, particularly plasticity. An especially advantageous method for hydrating quicklime is described in United States Patents Nos. 2,309,168 and 2,365,736.

According to these patents, water is mixed with the quicklime, and the mixture is introduced to a hydration cylinder. In this cylinder the quicklime is hydrated under pressure in the presence of water in the liquid state for a sufficient time to hydrate the calcium content and the major portion of the magnesia content of the quicklime. When the hydration has been completed, the resulting wet slaked quicklime is dried by effecting a finely divided dispersive discharge therefrom tinto an atmosphere capable of vaporizing substantially spontaneously the excess water carried by the lime particles dicharged, while still in a dispersed state, leaving a substantially dry powdered hydrated lime. If the process according to these patents is of the continuous type, a slurry of quicklime and water is continuously introduced to the hydration cylinder and the hydrated lime, water and steam are continuously discharged.

In processes for hydrating lime, such as described in the above-mentioned patents, wherein water is mixed with the lime and the mixture is conveyed to the hydration cylinder, fast-acting limes which have an essentially instantaneous hydration time, e.g. a hydration time of about 5 seconds or less, are extremely difficult to handle. These limes, upon addition of water thereto, are converted almost immediately into a thick paste. In conveying the mixture of lime and water to the hydrator, as for example by pumping, the mixture will solidify due to the hydration reaction, and the flow of the mixture to the hydrator is disrupted.

In order to overcome this problem, resort has been made to increasing the slaking time of the quicklime. For example, resort has been made to calcining of the lime at higher temperatures and/or for longer periods of time than ordinarily used has been to effect an increase in slaking time, but this procedure results in a reduction in plasticity and adversely affects other properties of the ultimate hydrated lime. The high temperatures and/or long burning times employed result in combination of silicon, iron, aluminum and other impurities in the lime in the form of undesirable ferrites, silicates, etc., the presence of which adversely affects the desired physical properties of the hydrated lime, such as plasticity, strength, sand carrying capacity, etc. In addition, hard burning involves increased production costs.

With these observations in mind a primary object of the present invention is to provide an improved method for making lime hydrate.

Another object of this invention is an improved method for making a hydrated lime from a fast-acting quicklime involving increasing the slaking time of the quicklime without adversely affecting the desirable physical properties of the resulting lime hydrate.

A further object if this invention is the provision of an improved method of making lime hydrate of substantially increased plasticity.

Still another object of this invention is a method for making a finishing lime from a quicklime normally unsuitable for such purpose.

A still further object of this invention is the provision of a method for treating a quicklime, particularly a fast-acting quicklime, to render it in a condition for hydration so as to provide a lime hydrate of high plasticity.

Yet another object of this invention is the provision of a method for increasing the plasticity of a hydrated fast-acting quicklime without resort to the use of pressure hydrating equipment.

Still another object of the invention is a process for obtaining higher plasticities for hydrated fast-acting quicklimes regardless of whether hydration is carried out under atmospheric or superatmospheric pressure.

These and other objects of the invention will become more clearly apparent from this specification and appended claims.

The process according to this invention comprises bringing a gaseous reactant selected from the group consisting of carbon dioxide, water vapor, and mixtures thereof, into contact with particles comprising a fast-acting quicklime at a temperature at which the gaseous reactant combines therewith, to form on the surface of the particles a film comprising in combination the gaseous reactant and quicklime, the remainder of said particles consisting essentially of quicklime, and thereafter hydrating the quicklime to form a substantially dry, powdery lime hydrate.

The process of this invention produces a number of extremely desirable results. One of the most important advantages to be obtained thereby is hydrated limes of substantially increased plasticity. As a matter of fact, by the present method quicklimes heretofore considered unfit for use as plastic finishing limes when in the hydrate form, because of their extremely low plasticity, may be converted into hydrates having a sufficiently high plasticity, about 200 or greater, to be useful as mortars, plasters, etc. This result is particularly surprising in view of the fact that if quicklime is hydrated in an atmosphere of steam, the resulting product is extremely non-plastic, and that if recarbonation takes place during the calcination of limestone, the resulting quicklime, when hydrated, is also extremely non-plastic.

A further benefit to be obtained by the method of this invention is an increase in the slaking time of fast-acting quicklimes without a reduction in plasticity. By increase in slaking tme as used in the specification is meant an increase in the time interval between initial contact of the quicklime with water and the time at which the hydration reaction has progressed sufficiently to produce steam. This result also is surprising in view of the fact that reduction in plasticity appears to accompany any increase in slaking time effected by methods heretofore known. The increase in slaking time is particularly advantageous in those processes where the lime is mixed with water and subsequently conveyed to the hydration cylinder as in the processes described in United States Patents Nos. 2,309,168 and 2,356,736, briefly discussed above. This increase in slaking time permits transfer of the quicklime-water mixture from the point where the quicklime and water are combined to the hydration cylinder without fear of the mixture forming a non-flowable, thick mass.

It is believed that by the method of this invention the quicklime particles become coated at least in part with a thin film, possibly a layer only a few molecules thick, comprising in combination the gaseous reactant and quicklime. The surface of the particles upon which this film is formed comprises, in addition to the outer shell of the particles, interior surface portions provided by the porous lattice structure of the quicklime particles which are formed as a result of calcination of the limestone. The exact manner in which the gaseous reactants combine with the quicklime particles is not entirely understood. The molecules of reactant may be merely adsorbed as such on the surface of the particles, or they may react chemically with the quicklime to form a surface film of calcium carbonate or calcium hydroxide, or both, depending upon the particular gaseous reactant or reactants employed. Thus the term "combine" as used in this specification and claims means any physical or chemical association of the gaseous reactants with the surface of the quicklime particles.

This film comprising in combination the reactant and quicklime apparently permits water in the liquid phase to penetrate the particles of the quicklime, the interior of which consists essentially of quicklime, so that throughout the interior of each particle, water in the liquid phase is present when the quicklime changes from the oxide form to the hydroxide form, a condition believed to contribute materially to the high plasticities obtained by the method of this invention.

The fast-acting quicklimes which may be employed in the method of this invention comprise any of the well known types of quicklimes, such as high calcium quicklimes whose magnesium content generally runs approximately 2% or less but it may run as high as from 5–10%; high magnesium quicklimes which are usually made from practically pure dolomite and contain approximately 40% magnesium oxide; and quicklimes in between those two magnesium contents which are usually known as magnesium quicklimes.

Because of the high porosity of quicklime particles, the method of this invention may be satisfactorily carried out with a wide range of sizes of particles. The particles may be as small as those found in fine dusts up to large lump sizes. Preferably, the particles are ground so that the larger particles do not substantially exceed about ¼ inch.

The quicklime particles should be at a temperature at which the reactants combine rather readily therewith. The temperature will primarily depend upon the reactant gas employed.

In the method of this invention where the reactant gas is carbon dioxide, the particles of quicklime should be at a temperature in the range between about 400° F. and below the decomposition temperature of the limestone, which will run between about 1400° F. and 1650° F., depending upon the chemical composition of the limestone. Within this range of temperatures carbon dioxide combines readily with calcium oxide, particularly if traces of water vapor are present. Below about 400° F. there is little combination of calcium oxide with carbon dioxide unless moisture is present. If carbon dioxide is the sole reactant employed, the quicklime particles are preferably at a temperature within the range between about 500° F. and 800° F.

Where the reactant gas consists essentially of carbon dioxide, and moisture is present either in the quicklime being treated or in gaseous state, as would be the case in a stack gas, the combining of the reactant with quicklime proceeds even at room temperature.

If water vapor is the primary reactant the temperature of the quicklime particles may be at room temperatures or at elevated temperatures, preferably above the boiling point of water. The preferred range of temperatures where the principal reactant comprises water vapor is between about 250° to about 450° F.

The temperature of the quicklime particles where the reactant gas comprises a mixture of carbon dioxide and water vapor, such as that exemplified by a stack gas, is generally the same as that employed where the reactant is water vapor.

As stated above, the gaseous reactants employed in this invention comprise carbon dioxide and water in the gaseous state, e.g. steam. These gaseous reactants may be used alone, in combination with each other, or in combination with other gases which do not react to any measurable degree with quicklime so as to adversely affect the plasticity of the ultimate lime hydrate. For example, the reactant gas may comprise pure carbon dioxide or steam or mixtures of these two gases. Also, the reactant gases may be present as constituents in flue gases resulting from the combustion of solid, liquid or gaseous fuels. In this case the quicklime particles may be contacted directly with a flue gas; preferably the flue gas is at elevated temperatures. A particularly useful gas containing both of the gaseous reactants is the flue gas from a lime kiln, which gas contains substantial portions of both water vapor and carbon dioxide and is readily available to the manufacturer of hydrated lime. Air, particularly moist air may be used.

Quicklimes vary enormously in both physical and chemical properties depending upon the limestone source and the calcination procedure used in making the quicklime. To a large degree the amount of gaseous reactant required for obtaining the highest plasticities will depend upon the particular quicklime composition and the particular gaseous reactant employed. However, as a general rule the benefits of this invention can be obtained by using sufficient water vapor so that from about $0.1 \times 10^{-4}$ to about $5 \times 10^{-4}$ mols thereof combine with the quicklime per square meter of surface area of the quicklime. Preferably, sufficient water vapor is used so that from about $0.5 \times 10^{-4}$ to about $2 \times 10^{-4}$ mols of water vapor are combined per square meter of surface area of the quicklime. This amount of water vapor ordinarily will combine with the quicklime when the quicklime is exposed to dry steam for a period of a few seconds in some cases to a few minutes in others. When carbon dioxide is the reactant, a sufficient quantity thereof should be brought in contact with the quicklime so that from about $0.02 \times 10^{-4}$ to about $2 \times 10^{-4}$ mols thereof are combined with the quicklime for each square meter of surface area of the quicklime, the preferred amount being about $0.1 \times 10^{-4}$ to $0.5 \times 10^{-4}$.

Where the reactant gas comprises a mixture of carbon dioxide and water vapor, as would be present in a flue gas, consideration should be given to the relative proportions of the two reactants. In most instances a few simple laboratory tests, similar to those of the following specific examples, will readily disclose to the user of this invention the amounts of the particular gaseous reactant required to provide a given quicklime with the highest plasticities.

The gaseous reactants should be at somewhat elevated temperatures when brought in contact with the quicklime particles. If the reactant is water, the temperatures should be sufficiently high to insure that the water is in the gaseous state, e.g. above 212° F. at atmospheric pressure. The temperature of the reactants ordinarily should be within the range between about 212° F. and 1000° F., although temperatures as high as 1500°–1650° F. may be employed. No particular advantage is to be gained by temperatures substantially above 1000° F. The preferred range of temperatures for the gaseous reactants is from about 250° to about 800° F.

After the quicklime particles have been contacted with the reactant gas as described above, the quicklime may be hydrated by any of the well known hydration processes. For example, the treated quicklime may be hydrated in such well known hydrators as the Corson, the Kritzer, the Schaffer, the Schulthess, or the Clyde hydrators. If the quicklime has been treated under optimum conditions, increased plasticities will result regardless of the method of hydration.

According to the preferred form of this invention the treated quicklime is hydrated according to the method of the United States patents discussed hereinabove, and United States Patent No. 2,409,546, wherein clustering of the finely divided hydrate in powder form after pressure hydration is disclosed. By combining the method of this invention with the hydration process of these patents even higher plasticities are obtained.

The plasticities referred to hereinabove and in the following examples are plasticities available substantially immediately with water as distinguished from a plasticity requiring hours of soaking to develop.

The following examples are illustrative of the present invention.

*Example I*

The apparatus employed comprised a chamber with a line connected to the top thereof for delivering steam to the chamber. The bottom of the chamber was provided with a screened vent. Steam at 140° F. was introduced to the chamber which contained about 300 grams of an Australian High calcium quicklime (approximately 83.5% CaO; 3.5% MgO; 8.9% silica as $SiO_2$; and 1.8% $Fe_2O_3$) having a particle size of about 97% through a 20 mesh screen, 69% through a 50 mesh screen, 35% through a 100 mesh screen, and 2.5% through a 200 mesh screen. The steam was introduced at the rate of about 8.8 ml. per minute for a period of 18 seconds.

300 g. of quicklime prepared as above was placed in a stainless steel beaker and to the quicklime was added 100 g. of water, and the water and quicklime were intimately mixed. This amount of water was determined as that amount theoretically required to completely hydrate the quicklime. Immediately upon addition of water to the quicklime, the stainless steel beaker was placed in an autoclave containing water in the bottom thereof and sealed from the atmosphere. The water in the bottom of the autoclave does not come in contact with the quicklime, and is converted to steam by electric heaters to build up pressure in the autoclave.

The pressure in the autoclave increased to about 90 pounds per square inch in about 15 minutes, and these conditions were maintained for approximately 20 minutes. At the end of the 20 minute period the pressure in the autoclave was reduced to atmospheric pressure in about one minute, and the sample of the resulting hydrated lime, which was in a dry powdery form, was removed and tested for slaking rate and plasticity.

Plasticities were obtained by means of an Emley plasticimeter; the higher the rating the more plastic is the lime.

The plasticity of the lime hydrate produced according to this example was 163. A hydrated lime produced from the same quicklime raw material, but which had not been subjected to the steam treatment according to this invention, had a plasticity of 128. The slaking time of the steam-treated quicklime was increased from about 5 seconds to about 15 seconds.

*Example II*

Approximately 300 g. of the lime of Example I was treated with Bunsen burner gas in the apparatus of that example for a period of one minute.

Approximately 600 g. of quicklime thus prepared was placed in a hydration cylinder which is provided with a mechanically driven agitator. The cylinder is also provided with a line for delivering water to the cylinder under pressure, and a discharge valve for discharging the contents of the cylinder into a porous, bag-type container through which steam and other gases may escape.

The cylinder, which was at a temperature of about 250° F., was sealed from the atmosphere and about 433 g. of water were introduced to the cylinder under pressure. This amount of water is 120% in excess of the amount of water necessary to effect complete hydration of the lime.

Upon addition of water to the cylinder, the pressure in the cylinder increased, and after approximately 15 seconds the pressure was about 225 p.s.i. At the end of about 20 minutes the pressure dropped to about 60 p.s.i. and the discharge valve was opened whereby substantially the entire contents of the cylinder, comprising hydrated lime, water and steam was discharged into the porous collecting bag. Due to the intrinsic heat of these materials the water was flashed from the hydrated lime leaving a dry powdery product.

Plasticities for the hydrated lime so produced were obtained by means of an Emley plasticimeter, and the plasticity was found to be 286. A hydrated lime produced from the same quicklime raw material, but which had not been treated with carbon dioxide had a plasticity of 149. The slaking time of the treated quicklime was about 15 seconds as compared to about 5 seconds for the untreated quicklime.

*Example III*

Approximately 300 g. of a Pennsylvania high calcium lime (92% CaO; 6% MgO; 1% silica; 1% $Fe_2O_3$ and other oxides) were placed in the apparatus of Example I. The sieve analysis for this lime was 97.2% through 100 mesh sieve and 1.6% through 200 mesh sieve. Carbon dioxide at room temperature was introduced to the chamber at a rate providing a pressure of 10 inch column of water for a period of 3 minutes.

300 g. of quicklime prepared as above was placed in a stainless steel beaker with 100 grams of water, which amount of water is that theoretically required to completely hydrate the quicklime. The sample was autoclaved in the same manner as in Example I.

Plasticity was obtained by means of an Emley plasticimeter and the plasticity of the hydrated lime produced according to this example was 163. Hydrated lime produced from the same quicklime raw material and hydrated in the same manner, but which had not been subjected to the treatment with carbon dioxide, had a plasticity of 122. The slaking time of the treated quicklime was about 12 seconds as compared to about 6 seconds for the untreated quicklime.

*Example IV*

Approximately 300 g. of a Canadian dolomitic quicklime (56.7% CaO; 42.2% MgO) having a screen analysis, 97.7% through a 20 mesh screen and 73.5% through a 200 mesh screen, was treated with cool carbon dioxide gas in the apparatus of Example I for a period of 5 seconds. The rate of flow of carbon dioxide gas to the sample was that equivalent to 10 inch column of water.

200 g. of quicklime prepared as above was mixed with 66.6 ml. of water in a Hobart mixer and the plasticity was determined by an Emley plasticimeter. The plasticity was 253. Hydrated lime produced from the same quicklime raw material and hydrated in the same manner, but which had not been subjected to the treatment with carbon dioxide, had a plasticity of 203. The slaking time of the treated quicklime was 95 seconds as compared to 22 seconds for the untreated quicklime.

What is claimed is:

1. A method for producing dry, powdery hydrated lime which comprises preparing a fast-acting quicklime for hydration by bringing a gaseous reactant selected from the group consisting of water vapor and mixtures of carbon dioxide and water vapor into contact with a particulate fast-acting quicklime having a hydration time below about one minute, at a temperature to form on the surface of said particles a dry film comprising in combination said gaseous reactant and said quicklime, said temperature and the time of contact between said gaseous reactant and said quicklime particles being such that not more than about $5 \times 10^{-4}$ mols of water vapor and not more than about $2 \times 10^{-4}$ mols of carbon dioxide combine with said quicklime for each square meter of surface area of said quicklime, the unreacted portion of said particles consisting essentially of dry quicklime, whereby the slaking time of said quicklime is increased by at least about 100%, and thereafter hydrating said particles of quicklime with water essentially in the liquid state to form a substantially dry, powdery lime hydrate.

2. The method according to claim 1 in which said gaseous reactant comprises a flue gas containing carbon dioxide and water vapor.

3. The method according to claim 2 in which the quicklime is at a temperature within the range between about 250° and about 450° F., and the flue gas is at a temperature within the range between about 212° and about 1000° F.

4. In the method of making a dry, powdery lime hydrate in which the calcium oxide content and at least a major portion of the magnesia content of a fast-acting quicklime are hydrated under pressure with water in excess of that which will combine as water of hydration and the resulting slaked quicklime is dried by removing surplus water from the finely-divided hydrated lime particles by releasing the pressure to provide a powdery mass in which the particles of said hydrated lime are maintained in a finely-divided condition, the step which comprises prior to hydration preparing said fast-acting quicklime for hydration by bringing a gaseous reactant selected from the group consisting of water vapor and mixtures of carbon dioxide and water vapor into contact with a particulate fast-acting quicklime having a hydration time below about one minute, at a temperature to form on the surface of said particles a dry film comprising in combination said gaseous reactant and said quicklime, said temperature and the time of contact between said gaseous reactant and said quicklime particles being such that not more than about $5 \times 10^{-4}$ mols of water vapor and not more than about $2 \times 10^{-4}$ mols of carbon dioxide combine with said quicklime for each square meter of surface area of said quicklime, the unreacted portion of said particles consisting essentially of dry quicklime, whereby the slaking time of said quicklime is increased at least by about 100 percent.

5. The method according to claim 4 in which said gaseous reactant comprises a flue gas containing carbon dioxide and water vapor.

6. The method according to claim 5 in which the quicklime is at a temperature within the range between about 250° and about 450° F., and the flue gas is at a temperature within the range between about 212° and about 1000° F.

7. In a method for producing a dry, powdery hydrated lime in which the calcium oxide content and at least a major portion of the magnesia content of a fast-acting quicklime are hydrated under pressure with water in excess of that which will combine as water of hydration, the resulting slaked quicklime is dried by removing surplus water from the finely-divided hydrated lime particles by releasing the pressure to provide a powdery mass in which the particles of said hydrated lime are maintained in a finely-divided condition, and the finely-divided hydrate in powder form is subsequently clustered by pounding the hydrate as a powder between surfaces, a step which comprises prior to hydration preparing said fast-acting quicklime for hydration by bringing a gaseous reactant selected from the group consisting of water vapor and mixtures of carbon dioxide and water vapor into contact with a particulate fast-acting quicklime having a hydrating time below about one minute, at a temperature to form on the surface of the particles a dry film comprising in combination said gaseous reactant and said quicklime, said temperature and the time of contact between said gaseous reactant and said quicklime particles being such that not more than about $5 \times 10^{-4}$ mols of water vapor and not more than about $2 \times 10^{-4}$ mols of carbon dioxide combine with said quicklime for each square meter of surface area of said quicklime, the unreacted portion of said particles consisting essentially of dry quicklime, whereby the slaking time of said quicklime particles is increased by about 100 percent.

8. The method according to claim 7 in which said gaseous reactant comprises a flue gas containing carbon dioxide and water vapor.

9. The method according to claim 8 in which the quicklime is at a temperature within the range between about 250° and about 450° F., and the flue gas is at a temperature within the range between about 212° and about 1000° F.

No references cited.